(12) United States Patent
Cheesman

(10) Patent No.: US 6,301,053 B1
(45) Date of Patent: Oct. 9, 2001

(54) COMBINER ASSEMBLIES

(75) Inventor: Edward Cheesman, Maidstone (GB)

(73) Assignee: Bae Systems Electronics Limited (GB)

( * ) Notice: Subject to any disclaimer, the term of this patent is extended or adjusted under 35 U.S.C. 154(b) by 0 days.

(21) Appl. No.: 09/547,470

(22) Filed: Jun. 19, 2000

(30) Foreign Application Priority Data

Aug. 7, 1999 (GB) .................................. 9918587

(51) Int. Cl.⁷ .............................. G02B 27/14; G09G 5/00
(52) U.S. Cl. ................................. 359/632; 345/7
(58) Field of Search .............................. 359/13, 631, 632, 359/630, 822; 345/7, 9; 353/13, 14, 79

(56) References Cited

U.S. PATENT DOCUMENTS

| | | |
|---|---|---|
| 4,664,475 | 5/1987 | Ferrer . |
| 5,381,267 | 1/1995 | Woody . |
| 5,517,337 | * 5/1996 | Dupin et al. ............................. 359/13 |
| 6,072,444 | * 6/2000 | Burns ........................................ 345/7 |
| 6,078,428 | * 6/2000 | Rembert et al. ...................... 359/632 |

FOREIGN PATENT DOCUMENTS 1132769  11/1968  (GB) .
2 179 716 A  3/1987  (GB) .

* cited by examiner

*Primary Examiner*—Georgia Epps
*Assistant Examiner*—Saeed Seyrafi
(74) *Attorney, Agent, or Firm*—Kirschstein, et al

(57) ABSTRACT

A combiner assembly 20 has an optical combiner 21 mounted to a housing 22 which is further arranged for mounting to a roof structure of a flight deck of an aircraft. The combiner 21 is mounted within a frame 23 which is mounted to the housing 22. The frame 23 has first pivot point 24 which is attached to a first arm 25 which is also attached to the housing 22 at a second pivot point 26 located at a position remote from the first pivot point 24. First arm 25 is arranged to allow the combiner 21 to rotate around the housing 22 between a deployed position and a stowed position. A second arm 27 is pivotally connected to the frame 22 at a third pivot point 28, at a position spaced from the first pivot point 24, and to the housing 22 at a fourth pivot point 29, located at a position remote from the third pivot point 28 and at a position spaced from the second pivot point 26. The pivot points 24, 26, 28 and 29 are arranged such that the first and second arm 25, 27 are positioned in a non-parallel arrangement and traverse a pathway wherein the mean distance between the combiner 21 and housing 22 varies during rotational movement of the combiner 21 with respect to the housing 22.

9 Claims, 3 Drawing Sheets

COMBINER ASSEMBLIES

BACKGROUND OF THE INVENTION

The present invention relates to combiner assemblies having a combiner through which a user views an outside scene overlaid with a projected image. Such combiner assemblies can be used in head up displays.

FIG. 1 illustrates a typical combiner assembly 10 used in a head up display, which comprises an optical combiner 11 mounted to a housing 12 which is arranged for mounting to a roof structure 13 of a flight deck of an aircraft. The combiner assembly 10 comprises a semi-reflective surface and is arranged to present flight, navigation, guidance and other information to a user who views an outside scene through the optical combiner 11. This is accomplished by projecting images from a display forming section 14, typically comprising a cathode ray tube, onto the semi-reflective surface which is arranged to allow the user to view the outside scene through the optical combiner 11 and to reflect the images from the display forming section 14 along a sight line of the user. The image conveyed to the user is collimated and conformal such that the user views the outside scene overlaid with the projected images. Typically, the optical combiner 11 is pivotally mounted, not illustrated, to the housing 12 such that the optical combiner 11 can be moved from a stowed position above the user's head to a deployed position in front of the user and coincident with the user's sight line.

However, if the optical combiner 11 is not properly secured in the stowed position it may rotate from its position such that it interferes with the user's vision, or worse, impacts the user's head. Furthermore, should the user move forward while the optical combiner 11 is in the deployed position, perhaps due to the aircraft flying into turbulent air, and impacts the optical combiner 11 then this could interfere with the safe and proper handling of the aircraft.

SUMMARY OF THE INVENTION

It is an object of the present invention to provide a combiner assembly which obviates or mitigates the problems associated with the prior art.

According to the present invention, a combiner assembly comprises an optical combiner, a housing and a mounting assembly arranged to connect the optical combiner to the housing, wherein the optical combiner is arranged to rotate around the housing and the mean distance between the combiner and the housing varies with the angular rotation of the combiner around the housing.

In this manner, the optical combiner rotates around the housing such that it traverses a path wherein the mean distance between the optical combiner and the housing varies as the optical combiner rotates from a stowed position to a deployed position, through which the user can view a scene, and from the deployed position back to the stowed position, thereby reducing the risk of the combiner coming into contact with the user as the combiner moves to or from the stowed position.

Preferably, the mounting assembly may comprise a first arm pivotally mounted at one end to the optical combiner at a first pivot point and pivotally mounted at the other end to the housing at a second pivot point to provide rotational movement of the optical combiner around the housing, a second arm pivotally mounted at one end to the optical combiner at a third pivot point and pivotally mounted at the other end to the housing at a fourth pivot point to provide rotational movement of the optical combiner around the housing and the first and second arms are positioned in a non-parallel arrangement.

In this manner, the optical combiner rotates around the pivot points such that its tip, that end remote to the first and third pivot points, traverses a path wherein the mean distance between the optical combiner and the housing varies as the optical combiner rotates from a stowed position to a deployed position, through which the user can view a scene, and from the deployed position back to the stowed position.

At least one of the arms may be arranged to be adjustable in length to facilitate setting the angular position of the optical combiner.

Preferably, the optical combiner may be arranged to move between stowed and deployed positions and the pivot points are arranged so that the optical combiner traverses a locus, wherein on at least one point of the locus the optical combiner is located closer to the housing than the optical combiner is when located in either the stowed or deployed positions.

The pivot points may be arranged to allow the optical combiner to rotate down into the deployed position at which point the user views the scene. Preferably, the pivots may be arranged to allow the optical combiner to rotate past the deployed position to a further position thereby to allow a degree of movement for the optical combiner should a user impact the optical combiner. The second arm may be a strut comprising a spring arranged to allow the optical combiner to rotate past the further position thereby to allow a further degree of movement for the optical combiner should a user impact the optical combiner.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
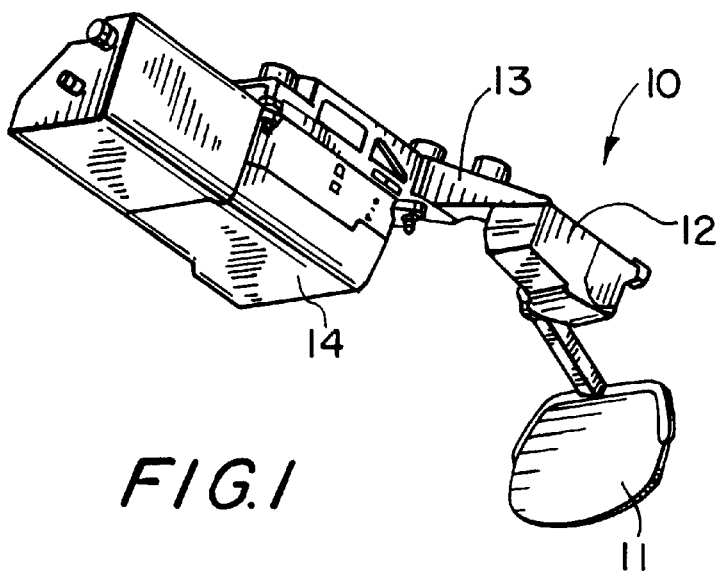
FIG. 1 illustrates generally a combiner assembly according to the prior art.
Figure 2:
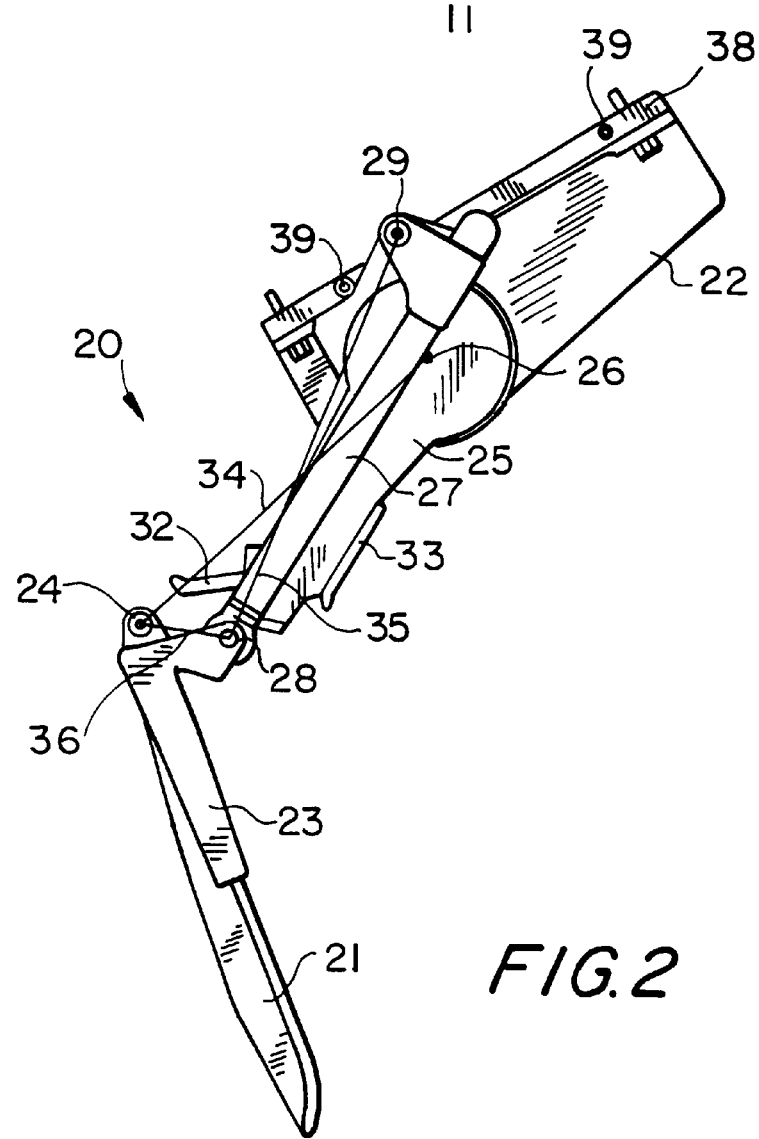
FIG. 2 illustrates a combiner assembly in elevation view.

In FIG. 2, a combiner assembly 20 comprises an optical combiner 21 mounted to a housing 22 using a mounting assembly which is arranged for mounting to a roof structure, not shown, of a flight deck of an aircraft. The combiner assembly 20 is arranged to present flight, navigation, guidance and other useful information to a user who also views a scene, typically a scene outside the aircraft, through the combiner 21, that is the combiner 21 provides a head up display, as discussed with reference to FIG. 1. The combiner 21 is mounted within a frame 23 which is arranged to be mounted to the housing 22. The combiner 21 comprises a suitable material such as glass which is capable of reflecting images generated by a display forming section, not illustrated, along a sight line to the user of the combiner 21, such that the user will perceive the scene overlaid with images generated by the display forming section and reflected by the combiner 21. The image conveyed to the user is collimated and conformal with other design parameters considered when manufacturing a combiner assembly 20.

The frame 23 of the combiner assembly 20 has a first pivot point 24 which is attached to a first arm 25 which is also attached to the housing 22 at a second pivot point 26 located at a position remote from the first pivot point 24. The first arm 25 is arranged to allow the combiner 21 to rotate about the housing 22 between a deployed position, as shown in FIG. 2, and a stowed position, not illustrated.

A second arm 27 is pivotally connected to the frame 23 at a third pivot point 28, at a position spaced from the first pivot point 24, and to the housing 22 at a fourth pivot point 29, located at a position remote from the third pivot point 28 and at a position spaced from the second pivot point 26. The second arm 27 may take the form of a spring bias strut. It will be understood that the first and second arms 25, 27 constitute the mounting assembly connecting the combiner 21 to the housing 22.

The pivot points 24, 26, 28 and 29 are arranged in such a manner that the first and second arms 25, 27 are positioned in a non-parallel arrangement so that the combiner 21 traverses a pathway wherein the mean distance between the combiner 21 and the housing 22 varies during rotational movement about the pivots 24, 26, 28 and 29 when the combiner 21 is moved between a deployed position, shown in FIG. 2, and a stowed position, not illustrated. Furthermore, when the combiner 21 is moved from the stowed position to the deployed position the combiner 21 will return to a repeatable accurate location.

Figure 3:
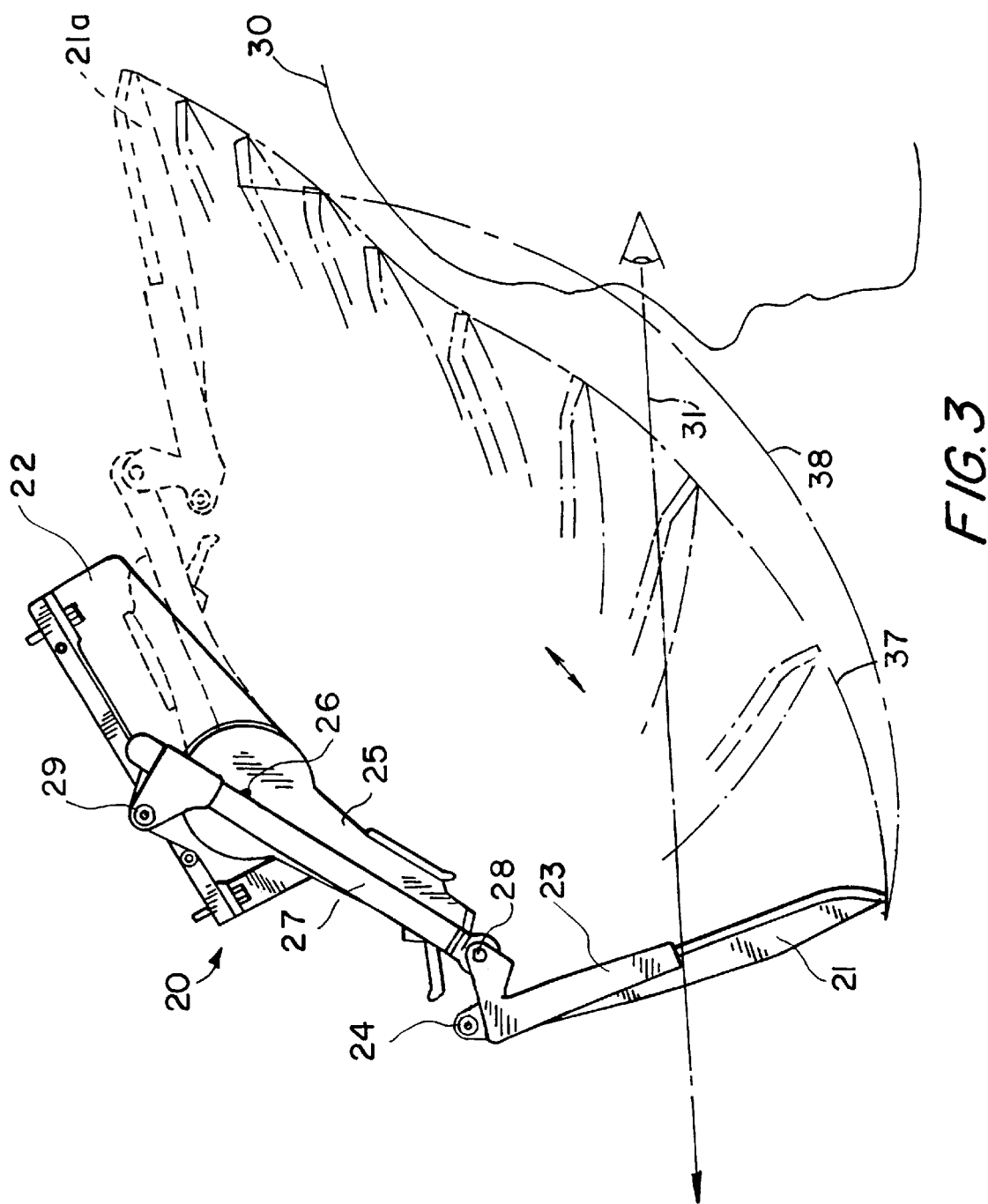
FIG. 3 schematically illustrates the movement of a combiner, as illustrated in FIG. 2, from a deployed position to a stowed position.

From FIG. 3, in which like references have been used to indicate similar integers to those referenced in FIG. 2, a user 30 of the combiner 21 views images projected from a display forming section, not illustrated, along a sight line 31, which are overlaid on a scene, not illustrated, viewed through the combiner 21. The combiner 21 is moveable along the pathway between a combiner 21 position shown as solid lines in a deployed position and a combiner 21a position illustrated by dotted lines in a stowed position. As the pathway formed by the rotation of the combiner 21 around the housing 22 forms a locus wherein on at least one point of the locus the combiner 21 is closer to the housing 22 than the combiner 21 is when located in either the stowed or deployed positions, greater clearance is provided as the tip of the combiner 21, that end remote to the first and third pivot points 24 and 28, as it passes at its nearest point to the user 30 when the combiner is moved between the deployed and stowed positions.

Referring back to FIG. 2, the first arm 25 also carries a cooperating pair of release mechanisms 32 and 33 which cooperate to latch the combiner 21 in either the stowed or the deployed positions. The combiner 21 is shown in the deployed position. A user operates the release mechanism 33 to delatch the combiner 21 so that the user may move the combiner 21 from the deployed position to the stowed position. When in the stowed position the user operates release mechanism 32, which cooperates with release mechanism 33, to delatch the combiner 21 so that it may be dropped under gravity to the deployed position.

Figure 4:
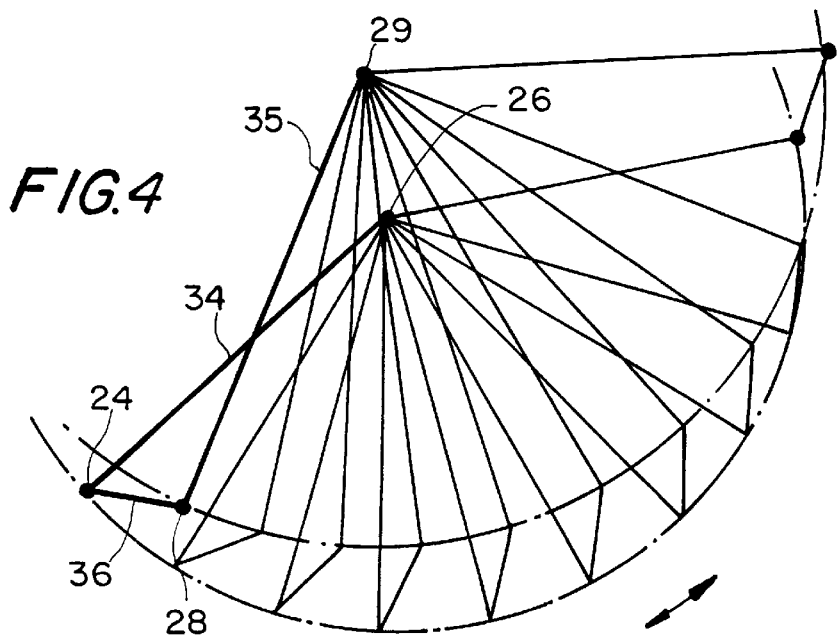
FIG. 4 schematically illustrates the movement of a combiner about various pivot points when the combiner is moved from a deployed position to a stowed position.

As illustrated in FIG. 2, the first and second arms 25 and 27 may be considered a pair of non-parallel links 34 and 35, respectively, and the space between the first and third pivot points 24 and 28 may be considered to be a third link 36. The movement of these links 34, 35, and 36 is illustrated in FIG. 4, in which like references have been used to indicate similar integers as those referenced in FIG. 2. The movement of the links 34, 35 and 36 ensures that the tip of the combiner 21 follows a pathway wherein the mean distance between the housing 22 and the combiner 21 varies with angular rotation of the combiner 21 about the housing 22 such that more clearance is provided between the tip of the combiner 21 and the head of a user.

The locus 37 formed by the movement of the tip of the combiner 21 is indicated in FIG. 3 as a chained line, where it can be seen that the locus 37 provides greater headroom for the user 30 than would normally be present for a combiner 21 that merely pivots about a pivot point following a radial pathway 38, indicated as a double chained line, when moving between deployed and stowed positions.

A further advantage of the combiner assembly 20, as best shown in FIG. 3, is that should the combiner 21 not be properly latched in the stowed position and should it fall from this position, then it is less likely to impact the head of the user 30 and movement from this position will indicate to the user 30 that it has not latched in the correct stowed position. The user 30 can then move the combiner 21 back to a proper latched stowed position.

Figure 5:
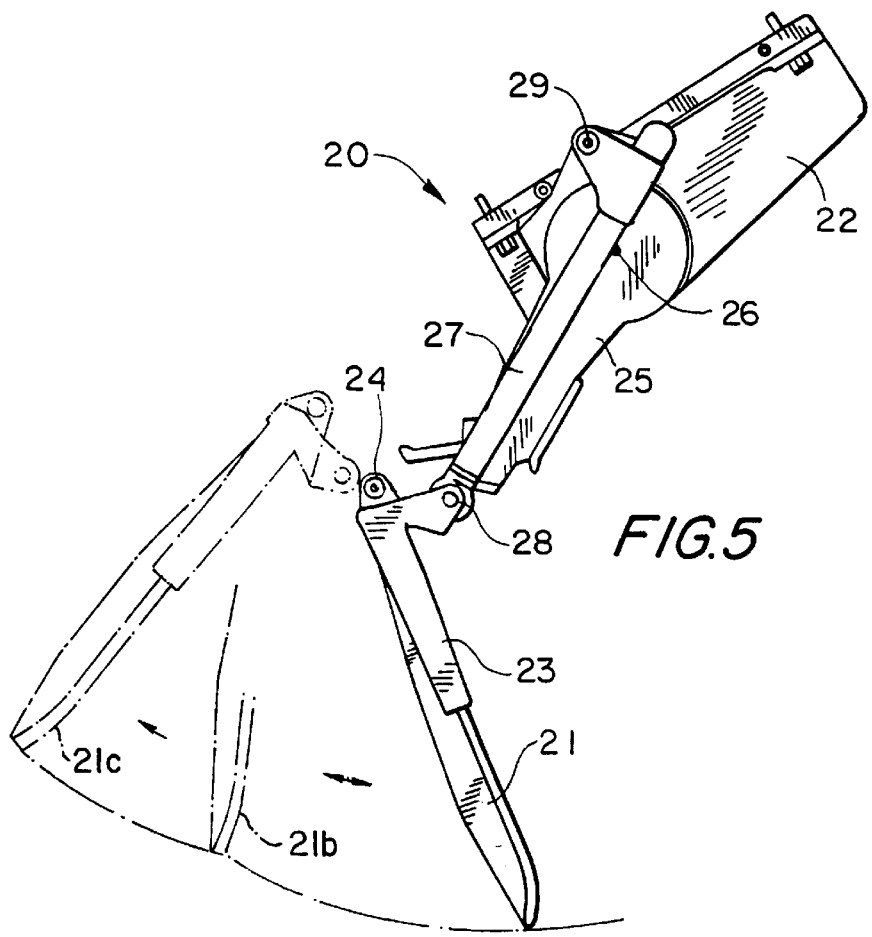
FIG. 5 illustrates in elevation view further positions for a combiner, as illustrated in FIG. 2.

FIG. 5, in which like references have been used to indicate similar integers to those referenced in FIG. 2, illustrates that should a user of the combiner 21 accidentally or otherwise impact the combiner 21, it will rotate about the second pivot point 26 from the position shown in solid lines to a more forward position 21b indicated by dotted lines where it is retained by a detent arrangement within the housing 22 until the user returns the combiner 21 to its original position. The detent arrangement may be arranged to allow the combiner 21 to move forward but only to the aircraft's airframe limits to prevent damage to either the airframe, which may be glass, or the combiner 21.

Furthermore, if, while the combiner 21 is in the forward position 21b, the user further impacts the combiner 21, a spring, not illustrated, associated with the second arm 27 will allow the length of arm 27 to extend thereby allowing the combiner 21 to rotate about the first pivot point 24 to a further position 21c indicated by chained lines. Once the user stops applying pressure to the combiner 21 it will return under the bias of the spring to the position indicated by 21b and can only be returned to a proper deployed position 21 when the user so moves it to that position. Preferably, the spring is housed within the second arm 27. These features reduce the injurious effects on the user due to impact with the combiner 21 by cushioning the blow since the combiner 21 is able to rotate to more forward positions either 21b or 21c.

The combiner assembly 20 may also comprise switching means to ensure that should the combiner 21 be moved to forward position 21b that the display forming section, not shown, will be switched off such that spurious images are not projected onto the combiner 21 which could be misread due to the misalignment of the combiner 21. This can be achieved by arranging a switch and cam arrangement or an electronic device within the housing 22 such that when the combiner 21 moves to the more forward position 21b, rotation of the first arm 25 about the second pivot point 26 also causes the cam arrangement to rotate and operate the switch or electronic device so as to prohibit images, from the display forming means, from being projected to the combiner 21.

Preferably, the switch is a micro switch that is mounted in a groove within the housing 22 and is operable when the first arm 25 rotates about the second pivot point. In this manner the micro switch can be retained within the housing 22 so as to form a more compact combiner assembly 20 in an environment in which space is limited.

As best illustrated in FIG. 3, the combiner assembly 20 when in a stowed position does not protrude into the user's 30 head space thereby providing greater head room for the user 30 and mitigating the possibility of the user's 30 head impacting against part of the combiner assembly 20 when the user 30 reaches forward.

From FIG. 2, the housing 22 can be mounted on a mounting plate 38 which is further mounted to the roof structure of the flight deck such that adjustment screws 39 associated with the mounting plate 38 can be manipulated to allow alignment of the combiner 21 in rotation, sideways, fore and aft directions. Furthermore, the frame 23 retaining the combiner 21 may also allow adjustment of the combiner 21 to allow alignment of the combiner 21 in elevation. Adjustments of the combiner assembly 20 can be completed on a purpose built optical alignment jig prior to mounting of the combiner assembly 20 in the aircraft or in the aircraft while the combiner assembly 20 is in situ. In the former case, the combiner assembly 20 will not require further adjustment after installation and this will also allow combiner assemblies 20 to be readily interchangeable.

It will be understood that although the combiner assembly 20 is described with reference to a head up display for an aircraft, it is envisaged that the combiner assembly 20 could be used in alternative means of transport or other environments in which information needs to be conveyed to a user and overlaid on the user's view of a forward scene.

What is claimed is:

1. A combiner assembly, comprising an optical combiner, a housing and a mounting assembly arranged to connect the optical combiner to the housing, wherein the optical combiner is arranged to rotate around the housing and the mean distance between the combiner and the housing varies with angular rotation of the combiner around the housing.

2. A combiner assembly, as in claim 1, wherein the mounting assembly comprises a first arm pivotally mounted at one end to the optical combiner at a first pivot point and pivotally mounted at the other end to the housing at a second pivot point to provide rotational movement of the combiner around the housing, a second arm pivotally mounted at one end to the optical combiner at a third pivot point and pivotally mounted at the other end to the housing at a fourth pivot point to provide rotational movement of the combiner around the housing and the first and second arms are positioned in a non-parallel arrangement.

3. A combiner assembly, as in claim 2, wherein at least one of the arms is arranged to be adjustable in length to facilitate setting the angular position of the optical combiner.

4. A combiner assembly, as in claim 2, wherein the optical combiner is arranged to move between stowed and deployed positions and the pivot points are arranged so that the optical combiner traverses a locus, wherein on at least one point of the locus the optical combiner is located closer to the housing than the optical combiner is when located in either the stowed or deployed positions.

5. A combiner assembly, as in claim 2, wherein the pivot points are arranged to allow the optical combiner to rotate down into the deployed position at which point the user views the scene.

6. A combiner assembly, as in claim 5, wherein the pivots are arranged to allow the optical combiner to rotate past the deployed position to a further position thereby to allow a degree of movement for the optical combiner should a user impact the optical combiner.

7. A combiner assembly, as in claim 6, wherein the second arm is a strut comprising a spring arranged to allow the optical combiner to rotate past the further position thereby to allow a further degree of movement for the optical combiner should a user impact the optical combiner.

8. A head up display, including a combiner assembly, comprising an optical combiner, a housing and a mounting assembly arranged to connect the optical combiner to the housing, wherein the optical combiner is arranged to rotate around the housing and the mean distance between the combiner and the housing varies with angular rotation of the combiner around the housing.

9. A combiner assembly for an aircraft, the combiner assembly comprising an optical combiner, a housing and a mounting assembly arranged to connect the optical combiner to the housing, wherein the optical combiner is arranged to rotate around the housing and the mean distance between the combiner and the housing varies with angular rotation of the combiner around the housing.

* * * * *